United States Patent
Seneger et al.

(10) Patent No.: US 12,145,595 B2
(45) Date of Patent: Nov. 19, 2024

(54) IN-VEHICLE SOUNDSCAPE AND MELODY GENERATION SYSTEM AND METHOD USING CONTINUOUSLY INTERPRETED SPATIAL CONTEXTUALIZED INFORMATION

(71) Applicant: Volvo Car Corporation, Gothenburg (SE)

(72) Inventors: Jon Seneger, Monte Sereno, CA (US); Sihao Ding, Sunnyvale, CA (US); Peter Winzell, Mountain View, CA (US)

(73) Assignee: Volvo Car Corporation, Gothenburg (SE)

(*) Notice: Subject to any disclaimer, the term of this patent is extended or adjusted under 35 U.S.C. 154(b) by 242 days.

(21) Appl. No.: 17/870,219

(22) Filed: Jul. 21, 2022

(65) Prior Publication Data
US 2024/0025416 A1  Jan. 25, 2024

(51) Int. Cl.
*B60W 40/08* (2012.01)
*G10K 15/02* (2006.01)

(52) U.S. Cl.
CPC .............. *B60W 40/08* (2013.01); *G10K 15/02* (2013.01); *B60W 2420/403* (2013.01); *B60W 2554/4041* (2020.02)

(58) Field of Classification Search
CPC .......... B60W 40/08; B60W 2420/403; B60W 2554/4041; G10K 15/02
See application file for complete search history.

(56) References Cited

U.S. PATENT DOCUMENTS

| | | | |
|---|---|---|---|
| 2018/0364966 A1* | 12/2018 | Valeri | H04S 7/30 |
| 2021/0055796 A1* | 2/2021 | Mansbridge | G06F 3/167 |
| 2021/0197667 A1* | 7/2021 | Winton | B60R 16/037 |
| 2022/0276827 A1* | 9/2022 | Le-Nindre | G06F 3/167 |
| 2023/0401254 A1* | 12/2023 | Lebecque | G06F 16/637 |

* cited by examiner

Primary Examiner — Rodney A Butler
(74) Attorney, Agent, or Firm — Clements Bernard Walker; Christopher L. Bernard

(57) ABSTRACT

A system and method, including: a data input device coupled to a vehicle, wherein the data input device is operable for gathering input data related to one or more of an environmental context surrounding or within the vehicle, an occupant state within the vehicle, a vehicle state, a location of the vehicle, and a noise condition inside or outside of the vehicle; an artificial intelligence system coupled to the data input device, wherein the artificial intelligence system is operable for generating a sound qualifier based on the gathered input data related to the one or more of the environmental context surrounding or within the vehicle, the occupant state within the vehicle, the vehicle state, and the noise condition inside or outside of the vehicle; and an audio generation module operable for receiving the sound qualifier from the artificial intelligence system and synthesizing a soundscape based on the sound qualifier.

20 Claims, 8 Drawing Sheets

IN-VEHICLE SOUNDSCAPE AND MELODY GENERATION SYSTEM AND METHOD USING CONTINUOUSLY INTERPRETED SPATIAL CONTEXTUALIZED INFORMATION

TECHNICAL FIELD

The present disclosure relates generally to the automotive field. More particularly, the present disclosure relates to an in-vehicle soundscape and melody generation system and method using continuously interpreted spatial contextualized information.

BACKGROUND

Numerous conventional vehicles utilize automatic volume control, whereby sound system (including satellite and terrestrial radio) volume is adjusted based on vehicle speed. This maintains a relatively constant sound system volume-to-interior noise ratio, enhancing the driver and passenger experience. When the vehicle is moving a low rate of speed, the sound system volume is relatively lower. When the vehicle is moving at a high rate of speed, the sound system volume is relatively higher. This functionality is enabled by knowledge of the vehicle's speed based on a speedometer or electronic control unit (ECU) link. Such functionality is fairly simplistic.

Many newer vehicles are equipped with external cameras, interior cameras, interior microphones, and artificial intelligence (AI) systems. These external cameras and AI systems are operable for enabling autonomous driving (AD) and driver assistance (DA) systems that are capable of alerting drivers to objects surrounding a vehicle, assessing road conditions surrounding a vehicle, and performing automatic driving maneuvers, for example. These interior cameras and AI systems are operable for observing driver out-of-the-loop conditions, providing appropriate driver alerts, and performing automatic driving maneuvers, for example. These interior microphones and AI systems are operable for receiving voice commands from a driver or passenger, for example. To date, however, these devices and functionalities have not been fully leveraged to enhance driver and passenger experience features.

In-vehicle music systems and methods have been proposed that leverage current external cameras, interior cameras, interior microphones, global positioning system (GPS) and navigation maps, AI systems, and the like to provide driving pace-adapted music, external location, scene, weather, and road condition-adapted music, interior noise-adapted music, driver mood-adapted music, and big data-trained personalized playlists taking these functionalities into account. Fundamentally, these systems and methods provide tailored selections from playlist databases of existing music.

It should be noted that this background is provided as illustrative context and environment only. It will be readily apparent to those of ordinary skill in the art that the principles of the present disclosure may be applied in other contexts and environments equally.

SUMMARY

In accordance with the system and method of the present disclosure, soundscapes and melodies are procedurally generated from continuously interpreted spatial contextualized information. Soundscapes here means sets of harmonic tones that are generated to represent continuous tonality or music, as opposed to being simply selected from a playlist. Procedurally generated means created from a set of base capabilities that are continuously altered to represent novel variation. Thus, for the driver and occupants of a vehicle in motion, soundscapes and melodies are procedurally generated from continuously interpreted spatial contextualized information using a software solution to handle complex semantic understanding of surroundings; to create sound and tonality for an audial experience. This solution gives occupants in the cabin of a vehicle at speed soundscapes generated from an understanding of the vehicle's observations of the surrounding environment. The solution delivers audio that can both be accurately defined and abstractly interpret the semantic understanding of the vehicle's surroundings. The semantic description of the surroundings is derived from the hardware configuration and vehicle sensor data, delivering weighted identifiers organized in a heuristic model provided as an audio model application programming interface (API) for third party ingestion. The exposed heuristic model is used as triggers for delivering procedurally generated soundscapes and audio experiences.

In one illustrative embodiment, the present disclosure provides a system, including: a data input device coupled to a vehicle, wherein the data input device is operable for gathering input data related to one or more of an environmental context surrounding or within the vehicle, an occupant state within the vehicle, a vehicle state, a location of the vehicle, and a noise condition inside or outside of the vehicle; an artificial intelligence system coupled to the data input device, wherein the artificial intelligence system is operable for generating a sound qualifier based on the gathered input data related to the one or more of the environmental context surrounding or within the vehicle, the occupant state within the vehicle, the vehicle state, and the noise condition inside or outside of the vehicle; an audio generation module operable for receiving the sound qualifier from the artificial intelligence system and synthesizing a soundscape based on the sound qualifier; and a speaker disposed within the vehicle, wherein the speaker is operable for receiving the synthesized soundscape and delivering the synthesized soundscape to an occupant of the vehicle. The data input device includes one or more of: an external camera coupled to the vehicle; an interior camera coupled to the vehicle; a microphone coupled to the vehicle; a sensor coupled to the vehicle; and a global positioning and navigation system coupled to the vehicle. The sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape. The sound qualifier based on the gathered input data related to the one or more of the environmental context surrounding or within the vehicle, the occupant state within the vehicle, the vehicle state, and the noise condition inside or outside of the vehicle indicates an appropriate characteristic for the synthesized soundscape such that attention of the occupant is purposefully focused on a predetermined aspect of the environment of the vehicle. The audio generation module operable for receiving the sound qualifier from the artificial intelligence system and synthesizing the soundscape based on the sound qualifier using an explicit or implicit embedding in the sound qualifier. The audio generation module operable for receiving the sound qualifier from the artificial intelligence system and synthesizing the soundscape from a predetermined set of tones and frequencies. The artificial intelligence system includes a trained neural network.

In another illustrative embodiment, the present disclosure provides a method, including: gathering input data related to one or more of an environmental context surrounding or within a vehicle, an occupant state within the vehicle, a vehicle state, a location of the vehicle, and a noise condition inside or outside of the vehicle using a data input device coupled to the vehicle; generating a sound qualifier based on the gathered input data related to the one or more of the environmental context surrounding or within the vehicle, the occupant state within the vehicle, the vehicle state, and the noise condition inside or outside of the vehicle using an artificial intelligence system coupled to the data input device; receiving the sound qualifier from the artificial intelligence system and synthesizing a soundscape based on the sound qualifier using an audio generation module; and receiving the synthesized soundscape and delivering the synthesized soundscape to an occupant of the vehicle using a speaker disposed within the vehicle. The data input device includes one or more of: an external camera coupled to the vehicle; an interior camera coupled to the vehicle; a microphone coupled to the vehicle; a sensor coupled to the vehicle; and a global positioning and navigation system coupled to the vehicle. The sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape. The sound qualifier based on the gathered input data related to the one or more of the environmental context surrounding or within the vehicle, the occupant state within the vehicle, the vehicle state, and the noise condition inside or outside of the vehicle indicates an appropriate characteristic for the synthesized soundscape such that attention of the occupant is purposefully focused on a predetermined aspect of the environment of the vehicle. The audio generation module operable for receiving the sound qualifier from the artificial intelligence system and synthesizing the soundscape based on the sound qualifier using an explicit or implicit embedding in the sound qualifier. The audio generation module operable for receiving the sound qualifier from the artificial intelligence system and synthesizing the soundscape from a predetermined set of tones and frequencies. The artificial intelligence system includes a trained neural network.

In a further illustrative embodiment, the present disclosure provides a non-transitory computer-readable medium including instructions stored in a memory and executed by a processor to carry out steps, including: gathering input data related to one or more of an environmental context surrounding or within a vehicle, an occupant state within the vehicle, a vehicle state, a location of the vehicle, and a noise condition inside or outside of the vehicle using a data input device coupled to the vehicle; generating a sound qualifier based on the gathered input data related to the one or more of the environmental context surrounding or within the vehicle, the occupant state within the vehicle, the vehicle state, and the noise condition inside or outside of the vehicle using an artificial intelligence system coupled to the data input device; receiving the sound qualifier from the artificial intelligence system and synthesizing a soundscape based on the sound qualifier using an audio generation module; and receiving the synthesized soundscape and delivering the synthesized soundscape to an occupant of the vehicle using a speaker disposed within the vehicle. The data input device includes one or more of: an external camera coupled to the vehicle; an interior camera coupled to the vehicle; a microphone coupled to the vehicle; a sensor coupled to the vehicle; and a global positioning and navigation system coupled to the vehicle. The sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape. The sound qualifier based on the gathered input data related to the one or more of the environmental context surrounding or within the vehicle, the occupant state within the vehicle, the vehicle state, and the noise condition inside or outside of the vehicle indicates an appropriate characteristic for the synthesized soundscape such that attention of the occupant is purposefully focused on a predetermined aspect of the environment of the vehicle. The audio generation module operable for receiving the sound qualifier from the artificial intelligence system and synthesizing the soundscape based on the sound qualifier using an explicit or implicit embedding in the sound qualifier. The audio generation module operable for receiving the sound qualifier from the artificial intelligence system and synthesizing the soundscape from a predetermined set of tones and frequencies.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF ILLUSTRATIVE EMBODIMENTS

Again, in accordance with the system and method of the present disclosure, soundscapes and melodies are procedurally generated from continuously interpreted spatial contextualized information. Soundscapes here means sets of harmonic tones that are generated to represent continuous tonality or music, as opposed to being simply selected from a playlist. Procedurally generated means created from a set of base capabilities that are continuously altered to represent novel variation. Thus, for the driver and occupants of a vehicle in motion, soundscapes and melodies are procedurally generated from continuously interpreted spatial contextualized information using a software solution to handle complex semantic understanding of surroundings; to create sound and tonality for an audial experience. This solution gives occupants in the cabin of a vehicle at speed soundscapes generated from an understanding of the vehicle's observations of the surrounding environment. The solution delivers audio that can both be accurately defined and abstractly interpret the semantic understanding of the vehicle's surroundings. The semantic description of the surroundings is derived from the hardware configuration and vehicle sensor data, delivering weighted identifiers organized in a heuristic model provided as an audio model API for third party ingestion. The exposed heuristic model is used as triggers for delivering procedurally generated soundscapes and audio experiences.

Figure 1:
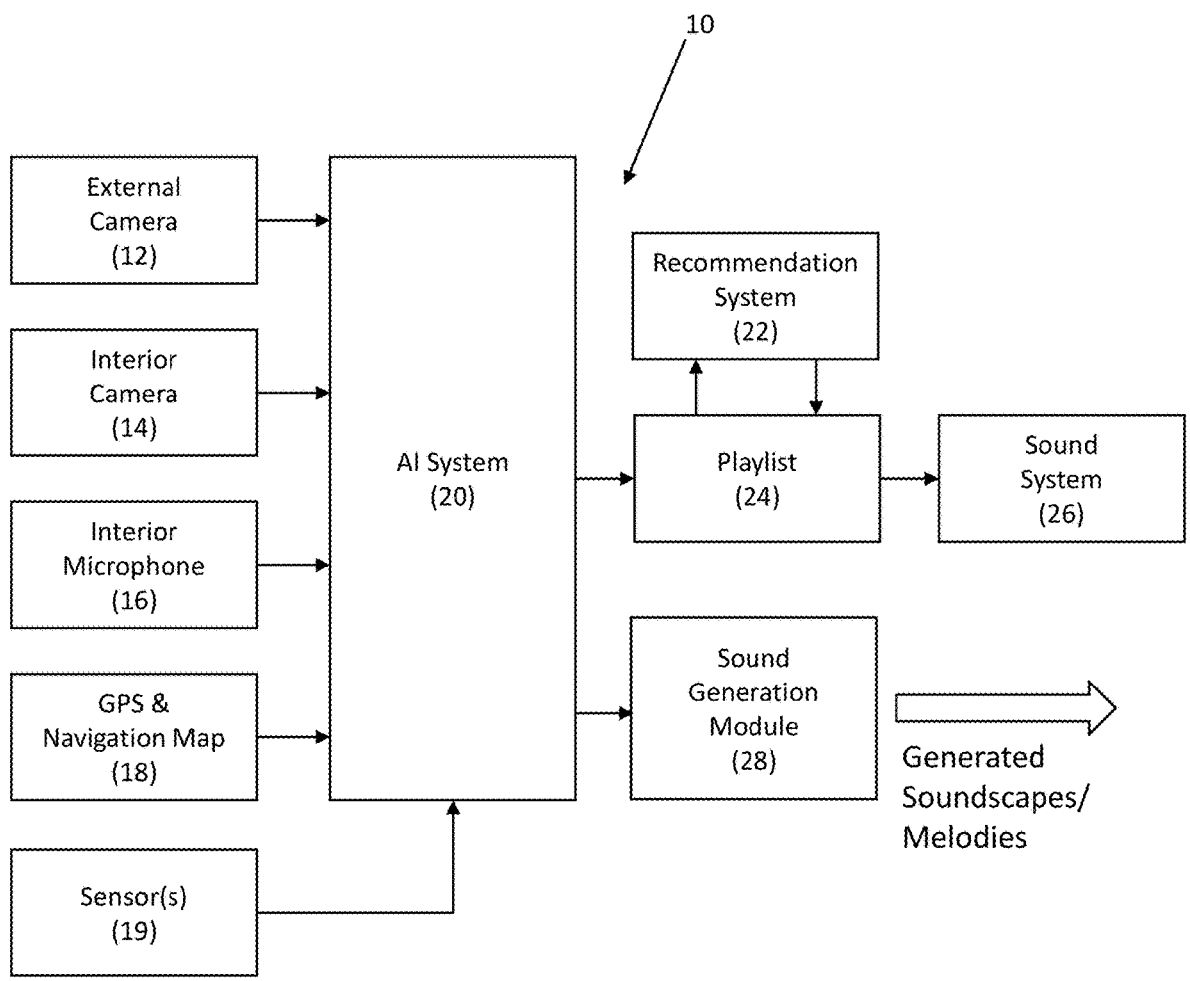
FIG. 1 is a schematic diagram of one illustrative embodiment of the in-vehicle music and soundscape and melody generation system of the present disclosure.

FIG. 1 is a schematic diagram of one illustrative embodiment of the in-vehicle music and soundscape and melody generation system 10 of the present disclosure. In general, the in-vehicle music system 10 includes the external camera(s) 12 of the vehicle, the interior camera(s) 14 of the vehicle, the interior microphone(s) 16 of the vehicle, the GPS and navigation map(s) 18 of the vehicle, and the various sensor(s) 19 of the vehicle (radar, lidar, etc.), all of which provide input to an AI system 20 that provides the adaptive logic of the in-vehicle music system 10. Again, many newer vehicles are equipped with such external cameras 12, interior cameras 14, interior microphones 16, sensor(s) 19, and such AI systems 20. These external cameras 12, sensor(s) 19, and AI systems 20 are operable for enabling AD and DA systems that are capable of alerting drivers to objects surrounding a vehicle, assessing road conditions surrounding a vehicle, and performing automatic driving maneuvers, for example. These interior cameras 14 and AI systems 20 are operable for observing driver out-of-the-loop conditions, providing appropriate driver alerts, and performing automatic driving maneuvers, for example. These interior microphones 16 and AI systems 20 are operable for receiving voice commands from a driver or passenger, for example. To date, however, these devices and functionalities have not been fully leveraged to enhance driver and passenger experience features.

Here, the above in-vehicle music system components 12, 14, 16, 18, 19, 20 are operable for using external inputs to make music suggestions, adjust volume levels, etc. in an automated manner based on observed environmental context. As is conventional, the AI system 20 utilizes a neural network (NN), such as a convolutional neural network (CNN), that is trained to segment and annotate images and/or identify sounds based on experiential learning. The present disclosure is agnostic related to these AI methodologies, and any suitable AI methodologies may be utilized equally. At a rudimentary level, based on the observed environmental context, the AI system 20 and a coupled recommendation system 22 make music suggestions and suggest or set an appropriate volume level using tagged suggestions from a user's playlist 24, available from a user's mobile device or the like, or tagged suggestions from a larger database forming part of the recommendation system 22. Such outside suggestions can then be added to or subtracted from the user's playlist 24 based on expressed user preferences (verbal or inputted via a graphical user interface (GUI)), and ultimately promulgated to the mobile device or the like. Ultimately, the environmental context appropriate music is broadcast via the sound system and speaker(s) 26 in the vehicle.

By way of example only, the in-vehicle music system 10 can be used to suggest rock music at louder volume when driving in an identified urban area or on a highway, or classical music at a softer volume when driving in an identified rural area or beautiful snowy conditions. The volume may be turned up proportionally when interior engine/motor or air conditioning (AC) fan noise is identified, or turned down proportionally when interior conversation is identified. Thus, the in-vehicle music system 10 can be used to set an appropriate mood for observed driving conditions, or respond to observed environmental conditions for convenience and safety. For example, if the external camera(s) 12 and/or interior microphone(s) 16 identify and emergency situation via lights, sirens, and/or the sound of an impact event, the music volume may be turned down or the music stopped, such that driver attention is promoted. In the case that contextual music suggestions are provided, the user's playlist may be expanded or contracted based on expressed user preferences.

The external camera(s) 12 may include front facing, rear facing, side facing, and/or bird's-eye-view (BEV) cameras, as well as other external perception sensors, such as radar and lidar. The recommendation system 22 utilizes tagged lists of music, with appropriate environmental context known in advance, whether in the recommendation system database or in the user's playlist 24. Volume control is provided on a proportional basis based on observed interior/external volume and/or identified sounds. The external camera(s) 12 utilize known computer vision (CV) and deep learning (DL) algorithms applied to the obtained images. This enables both object and scenario detection, as well as road condition detection—is the scene urban, rural, a highway, a country road, a mountain, a seashore, a bridge; is the road clear, wet, slippery, is there an accident or an emergency vehicle; etc.? The interior camera(s) 14 and interior microphone(s) 16 utilize known CV, computer hearing (CH), and DL algorithms applied to the obtained images and sounds. This enables both interior and external situational awareness—is the driver sleepy, excited, conversing, on the phone; is the vehicle noisy; is there and accident or emergency vehicle; etc.? The AI system 20 and recommendation system 22 can be used to set an appropriate mood or more effectively capture the driver's attention, thereby relaxing the driver or promoting greater safety. Thus, the interior microphone(s) 16 and associated software implement machine learning (ML) and natural language processing (NLP) algorithms to audio signals to increase volume responsive to certain high ambient noise levels, decrease volume responsive to certain high ambient noise levels, and decrease volume responsive to certain identified noises.

In accordance with the present disclosure, the soundscape and melody generation system 10 goes a step further. The feature vectors input to the NN 20 from the perception systems 12, 14, 16, 18, 19 are used to characterize the spatial contextual information of the vehicle, such as inside environment, outside environment, speed, road conditions, driver state, etc., providing a set of explicit or implicitly embedded qualifiers to a sound generation module 28 that is operable for not just indicating a set of ranked playlist selections, but rather generating appropriate audio sequences consisting of tonalities that match the given theme(s) at the time, on a per vehicle or per occupant basis. It should be noted that a master NN 20 may be used for this purpose, or dedicated NNs 20 may be used with each sensor suite 12, 14, 16, 18, 19. Thus, for example, on a trip of 1 hour or more, the vehicle can act as a hub of information collection, observing the vehicle occupants and surroundings and characterizing the overall environment as calm, tranquil, pastoral, low tempo, energetic, congested, urban, high tempo, etc. This then provides triggers for sound/tone generation with frequencies and harmonics that fit these categories, providing an appropriate ambiance for occupant relaxation, driver attention, etc. This sound/tone generation is adaptive based on a changing environment and changing reactions. This is described in greater detail herein below.

Figure 2:
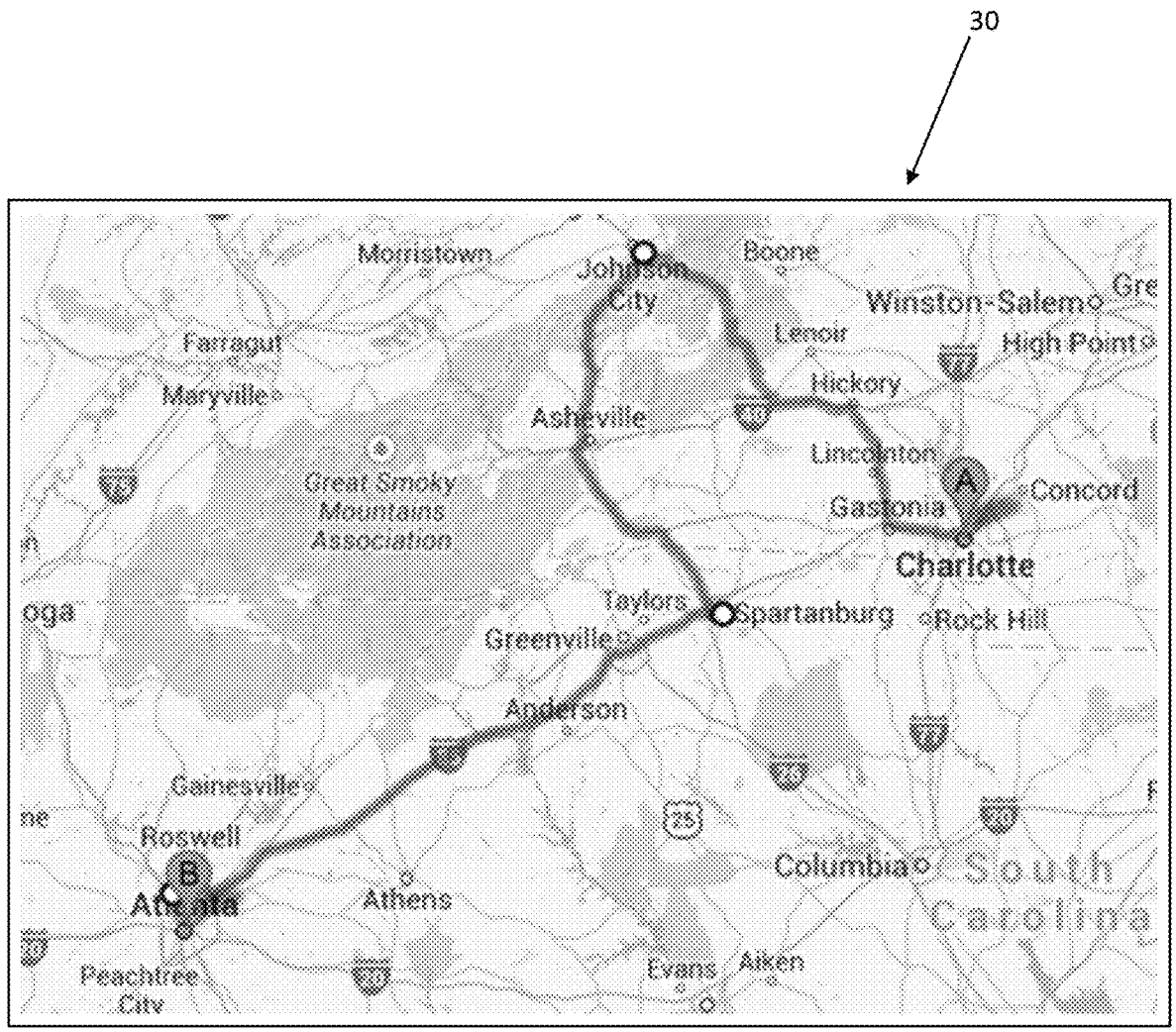
FIG. 2 is a schematic diagram illustrating the GPS and navigation map functionality of the in-vehicle music and soundscape and melody generation system of the present disclosure.

FIG. 2 is a schematic diagram illustrating the GPS and navigation map functionality 30 of the in-vehicle music system 10 (FIG. 1) of the present disclosure. Here, tagged music may be associated with different tagged GPS positions and navigation map locations, providing different location appropriate music suggestions. For example, on the map illustrated, different music suggestions may be associated with the mountains of Asheville, the city of Charlotte, the city of Atlanta, and the highway connecting these cities. These suggestions may be provided audibly and/or on the navigation map 30 itself, allowing the user to issue an appropriate voice or touch screen command to play the music, add the music to his or her playlist, and/or exclude the music from future recommendations.

It should also be noted that music characteristics can also be automatically adjusted based on observed environmental context. For example, bass and treble can be adjusted similar to volume based on identified conditions, thereby also enhancing the user experience.

Figure 3:
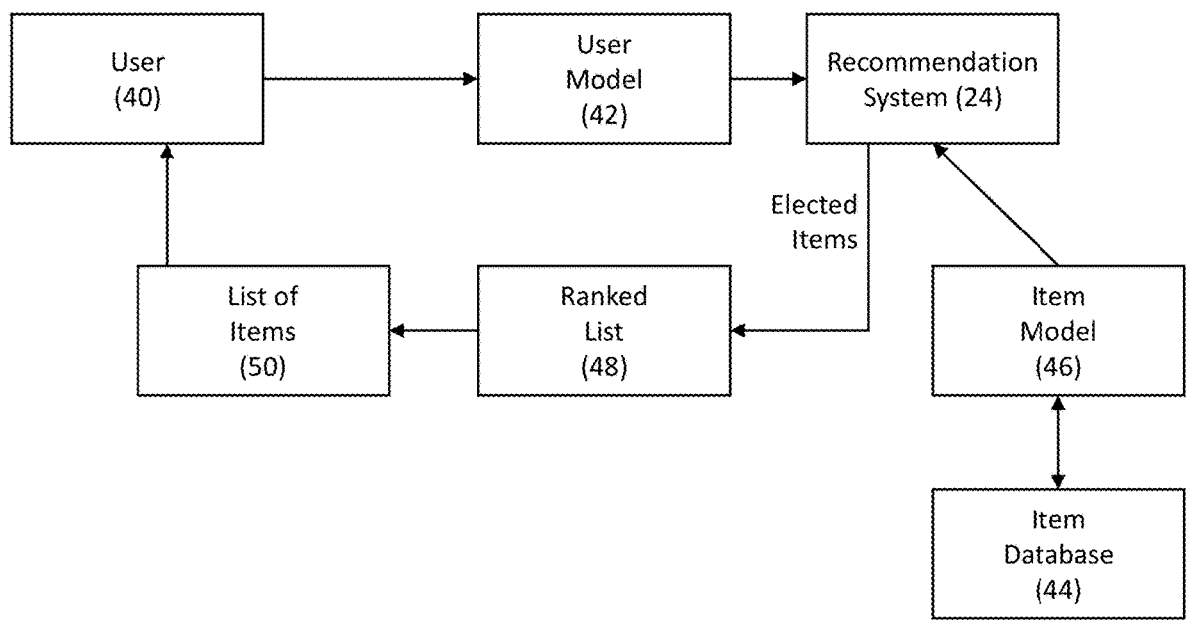
FIG. 3 is a schematic diagram illustrating a prior recommendation system functionality of an in-vehicle music system which can be utilized with the in-vehicle soundscape and melody generation system of the present disclosure.

FIG. 3 is a schematic diagram illustrating the recommendation system functionality of the in-vehicle music system 10 (FIG. 1) of the present disclosure. In terms of the AI-based personalized playlist, the process starts with a user 40 that is associated with a user model 42. This user model 42 includes the user playlist 24 (FIG. 1), optionally obtained from a user mobile device, past history, or the like, indicating the users preferred music and potentially other indicated preferences as well, such as types of music the user 40 likes or dislikes, instances in which the user 40 would like to hear more or less music, etc. This information is provided to the recommendation system 24, which makes further music and preference suggestions based on an item database 44 and an item model 46, likely including lists of tagged music and rules for making suggestions, controlling the volume, controlling music characteristics, etc. Based on an observed and identified environmental context, the recommendation system 24 makes suggested additions to the user's playlist 24 in the form of suggested music (or other audio content) to be played. It should be noted here that, "music" broadly encompasses any audio content, including talk radio, audio books, audio stories, and the like. For example, the recommendation system 24 may make position and/or context appropriate talk radio and audio story suggestions. Suggestions are provided to the user via audio prompts, the GUI, and/or the navigation map 30 (FIG. 2). The user 40 then selects preferred music or content from the suggestions, or creates a ranked list 48 of what he or she would like to hear and add to or remove from his or her playlist 24, thereby playing the music or content and expanding or contracting the playlist 24 with a list of items 50. The AI system 20 not only learns from the environmental context, but also from ongoing user selections and rejections, becoming more adept at making suggestions under given sets of circumstances with respect to a given user 40.

In accordance with the present disclosure, in addition to just tailoring a playlist to observed conditions, when a vehicle is operated, the various data collection modalities 12, 14, 16, 18, 19 collect input from and provide information about the environment. The understanding, or semantic context, of the environment processed from the vehicle signal input is mixed with external geo spatial information related to the vehicle's position and destination, collectively generating a contextual trigger for mood. This mood model is then used to generate audio, music, or soundscapes, subsequently delivered to the occupants of the vehicle. The generated sound derived from the mood model can be delivered as a spatial audio, personalized to the occupant and relevant to the environment. Input from the microphones, visual feed from the cameras, and metadata from the external systems (cloud solutions and map providers) can deliver continuous context for the mood model, as well as specific elements that should be emphasized. The delivery of audio through spatial capability allows the audio system to deliver and enhance elements; an object such as a person on a bike or an oncoming ambulance can be enhanced; and the audio can be pinpointed to the object in relation to the moving vehicle. When the soundscape that is procedurally and continuously created in relation to the environment is playing, elements that need attention, such as the person on the bicycle, will be enhanced with audio queues and locked to the object for attention with sounds that are linked to attention. The personalized audio experience related to status can be delivered as melodies, soundscapes, or even enhanced through contextualization of lyrics or titles of existing recordings, linked to the descriptive placement of the vehicle and journey of the vehicle and its occupants. This enables delivering a continuous and enjoyable audial experience, based on vehicle observation and external information. The audial experience can be procedurally generated to enhance the experience of the occupants and act as a theme tune for the journey, for example. Thus, a continuous and enjoyable audial experience, based on vehicle observation delivered in-cabin is an end-to-end capability for a procedurally generated audio experience, supported by vehicle observed semantic triggering.

Figure 4:
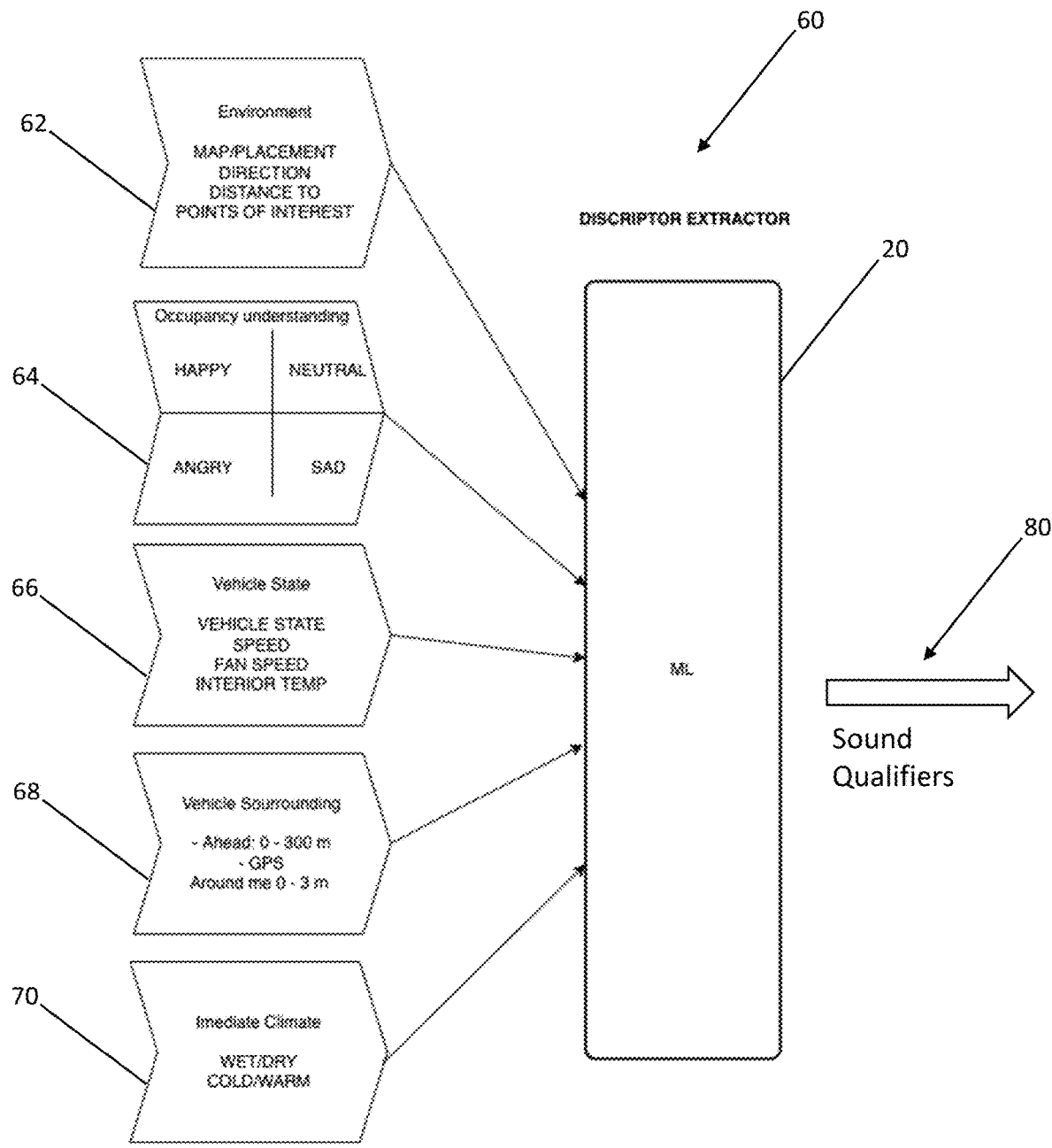
FIG. 4 is a schematic diagram illustrating a vehicle audio model API used in conjunction with the in-vehicle soundscape and melody generation system of the present disclosure.

FIG. 4 is a schematic diagram illustrating the vehicle audio model API 60 used in conjunction with the in-vehicle soundscape and melody generation system 10 (FIG. 1) of the present disclosure. The vehicle uses sensory data together with data services to generate a set of input parameters to the descriptor extractor NN 20, together with their recommended update frequencies. As illustrated, the input parameters may include, but are not limited to, environment data 62, such as map, direction, distance, destination, and point of interest data obtained from the GPS and navigation map(s) 18 (FIG. 1) and the like of the vehicle. The input parameters may also include occupancy understanding data 64 obtained from the interior camera(s) 14 (FIG. 1) and interior microphone(s) 16 (FIG. 1) and the like of the vehicle. From this, understanding of occupant mood and reaction (neutral, happy, sad, angry, approving/disapproving) can be obtained. The input parameters may further include vehicle state data 66 obtained from the sensor(s) 19 (FIG. 1) and the like of the vehicle. The input parameters may still further include vehicle surrounding data 68 obtained from the external camera(s) 12 (FIG. 1) and sensor(s) 19 and the like of the vehicle. These input parameters are important for establishing the type of environment that the vehicle is operating in and the general conditions to which the driver and occupants are exposed, having a significant impact on desired mood. The input parameters may still further include immediate climate data 70 obtained from the external camera(s) 12 and sensor(s) 19 and the like of the vehicle. These input parameters are also important for establishing the type of environment that the vehicle is operating in and the general conditions to which the driver and occupants are exposed, having a significant impact on desired mood. For example, wet, dry, cold, warm, clear, and stormy determinations can be made. All of this data is analyzed to formulate a set of sound qualifiers 80 that are then available to the audio generation/mood audio playback module 28 (FIG. 1) to synthesize appropriate audio that properly sets the occupant mood, directs occupant attention, etc.

Figure 5:
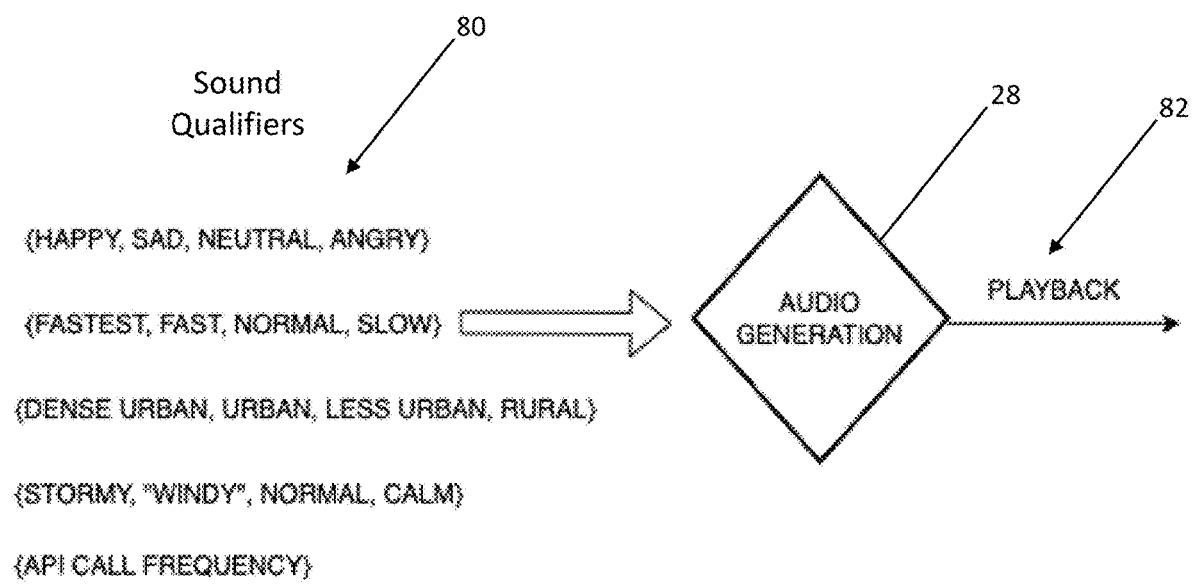
FIG. 5 is a schematic diagram illustrating an audio generation/mood audio playback module used in conjunction with the in-vehicle soundscape and melody generation system of the present disclosure.

FIG. 5 is a schematic diagram illustrating the audio generation/mood audio playback module 28 used in conjunction with the in-vehicle soundscape and melody generation system 10 (FIG. 1) of the present disclosure, providing the dynamic generated audio experience based on the spatial contextualization. Although the details of this aspect are not the focus of the present disclosure, the sound qualifiers 80 of the vehicle audio model API 60 are used to generate a immersive audio environment that that is experienced by the driver and occupants in the vehicle, again setting the occupant mood, directing occupant attention, etc.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 6:
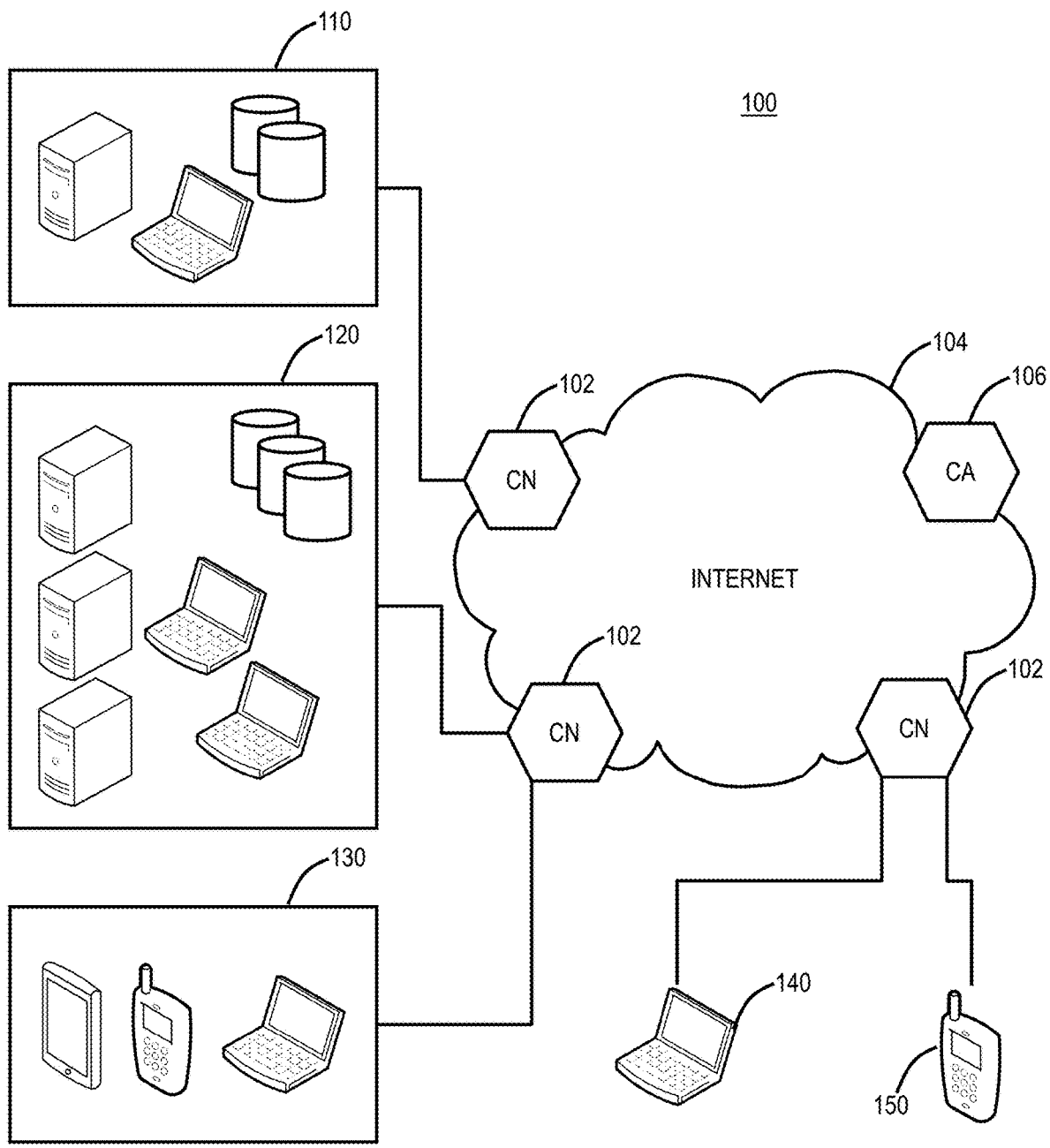
FIG. 6 is a network diagram of a cloud-based system for implementing the various algorithms and services of the present disclosure.
Figure 7:
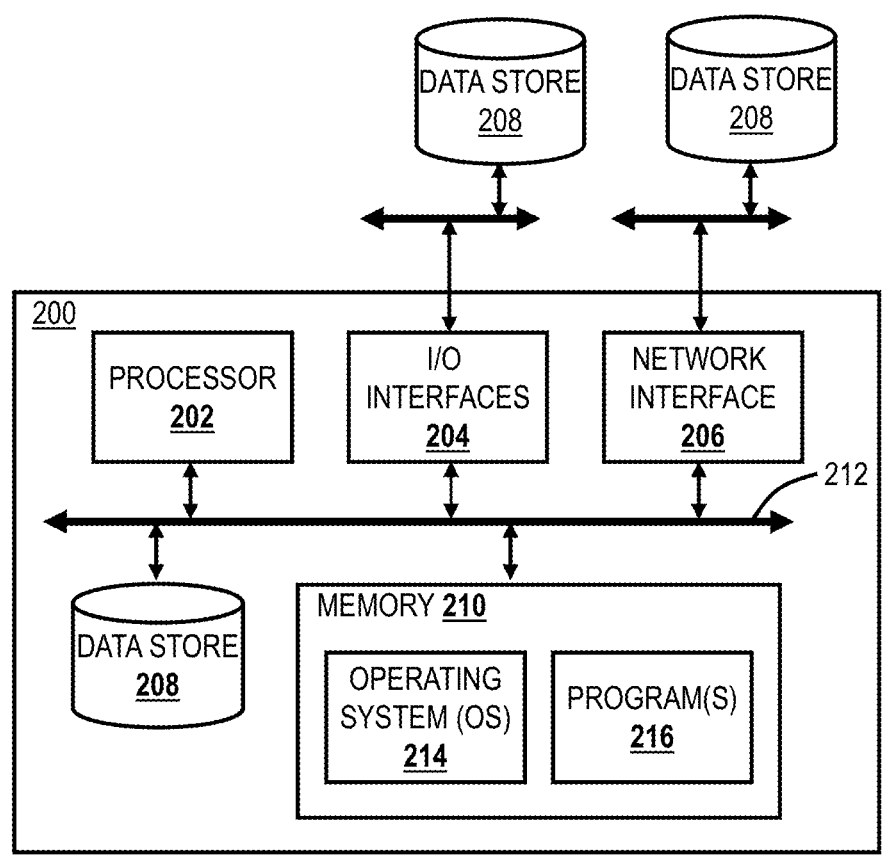
FIG. 7 is a block diagram of a server that may be used in the cloud-based system of FIG. 6 or stand-alone.

FIG. 6 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 7) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 7 is a block diagram of a server 200, which may be used in the cloud-based system 100 (FIG. 6), in other systems, or stand-alone. For example, the CNs 102 (FIG. 6) and the central authority nodes 106 (FIG. 6) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 6). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
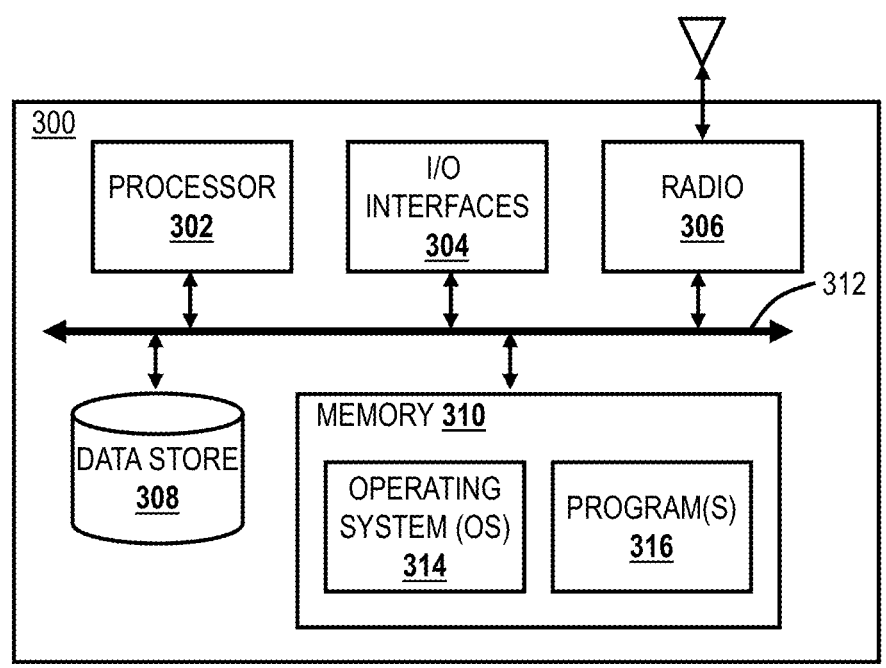
FIG. 8 is a block diagram of a user device that may be used in the cloud-based system of FIG. 6 or stand-alone.

FIG. 8 is a block diagram of a user device 300, which may be used in the cloud-based system 100 (FIG. 6), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 6).

Again, the present disclosure provides an in-vehicle music system and method that leverages current external cameras, interior cameras, interior microphones, GPS and navigation maps, AI systems, and the like to provide driving pace-adapted music, external location, scene, weather, and road condition-adapted music, interior noise-adapted music, driver mood-adapted music, and big data-trained personalized playlists taking these functionalities into account.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system, comprising:
a data input device coupled to a vehicle, wherein the data input device is operable for gathering input data related to one or more of an environmental context surrounding or within the vehicle, an occupant state within the vehicle, a vehicle state, a location of the vehicle, and a noise condition inside or outside of the vehicle;
an artificial intelligence system coupled to the data input device, wherein the artificial intelligence system is operable for generating a sound qualifier based on the gathered input data related to the one or more of the environmental context surrounding or within the vehicle, the occupant state within the vehicle, the vehicle state, and the noise condition inside or outside of the vehicle,
wherein the sound qualifier is based on the gathered input data related to the one or more of the environmental context surrounding the vehicle or the noise condition outside the vehicle and indicates an object;
an audio generation module operable for receiving the sound qualifier from the artificial intelligence system and synthesizing a soundscape based on the sound qualifier,
wherein the synthesized soundscape includes an appropriate characteristic associated with the object and configured to focus the occupant on the object, the appropriate characteristic of the soundscape pinpointed to the object in relation to movement of the vehicle; and
a speaker disposed within the vehicle, wherein the speaker is operable for receiving the synthesized soundscape and delivering the synthesized soundscape to an occupant of the vehicle.

2. The system of claim 1, wherein the data input device comprises one or more of:
an external camera coupled to the vehicle;
an interior camera coupled to the vehicle;
a microphone coupled to the vehicle;
a sensor coupled to the vehicle; and
a global positioning and navigation system coupled to the vehicle.

3. The system of claim 1, wherein the sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape.

4. The system of claim 1, wherein the audio generation module operable for receiving the sound qualifier from the artificial intelligence system and synthesizing the soundscape based on the sound qualifier using an explicit or implicit embedding in the sound qualifier.

5. The system of claim 1, wherein the audio generation module operable for receiving the sound qualifier from the artificial intelligence system and synthesizing the soundscape including at least one audio sequence generated from a predetermined set of individual tones and frequencies.

6. The system of claim 1, wherein the artificial intelligence system comprises a trained neural network.

7. A method, comprising:
gathering input data related to one or more of an environmental context surrounding or within a vehicle, an occupant state within the vehicle, a vehicle state, a location of the vehicle, and a noise condition inside or outside of the vehicle using a data input device coupled to the vehicle;

generating a sound qualifier based on the gathered input data related to the one or more of the environmental context surrounding or within the vehicle, the occupant state within the vehicle, the vehicle state, and the noise condition inside or outside of the vehicle using an artificial intelligence system coupled to the data input device,
wherein the sound qualifier is based on the gathered input data related to the one or more of the environmental context surrounding the vehicle or the noise condition outside the vehicle and indicates an object;
receiving the sound qualifier from the artificial intelligence system and synthesizing a soundscape based on the sound qualifier using an audio generation module, wherein the synthesized soundscape includes an appropriate characteristic associated with the object and configured to focus the occupant on the object, the appropriate characteristic of the soundscape pinpointed to the object in relation to movement of the vehicle; and
receiving the synthesized soundscape and delivering the synthesized soundscape to an occupant of the vehicle using a speaker disposed within the vehicle.

8. The method of claim 7, wherein the data input device comprises one or more of:
an external camera coupled to the vehicle;
an interior camera coupled to the vehicle;
a microphone coupled to the vehicle;
a sensor coupled to the vehicle; and
a global positioning and navigation system coupled to the vehicle.

9. The method of claim 7, wherein the sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape.

10. The method of claim 7, wherein the audio generation module operable for receiving the sound qualifier from the artificial intelligence system and synthesizing the soundscape based on the sound qualifier using an explicit or implicit embedding in the sound qualifier.

11. The method of claim 7, wherein the audio generation module operable for receiving the sound qualifier from the artificial intelligence system and synthesizing the soundscape including at least one audio sequence generated from a predetermined set of individual tones and frequencies.

12. The method of claim 7, wherein the artificial intelligence system comprises a trained neural network.

13. A non-transitory computer-readable medium comprising instructions stored in a memory and executed by a processor to carry out steps, comprising:
gathering input data related to one or more of an environmental context surrounding or within a vehicle, an occupant state within the vehicle, a vehicle state, a location of the vehicle, and a noise condition inside or outside of the vehicle using a data input device coupled to the vehicle;
generating a sound qualifier based on the gathered input data related to the one or more of the environmental context surrounding or within the vehicle, the occupant state within the vehicle, the vehicle state, and the noise condition inside or outside of the vehicle using an artificial intelligence system coupled to the data input device,
wherein the sound qualifier is based on the gathered input data related to the one or more of the environmental context surrounding the vehicle or the noise condition outside the vehicle and indicates an object;
receiving the sound qualifier from the artificial intelligence system and synthesizing a soundscape based on the sound qualifier using an audio generation module, wherein the synthesized soundscape includes an appropriate characteristic associated with the object and configured to focus the occupant on the object, the appropriate characteristic of the soundscape pinpointed to the object in relation to movement of the vehicle; and
receiving the synthesized soundscape and delivering the synthesized soundscape to an occupant of the vehicle using a speaker disposed within the vehicle.

14. The non-transitory computer-readable medium of claim 13, wherein the data input device comprises one or more of:
an external camera coupled to the vehicle;
an interior camera coupled to the vehicle;
a microphone coupled to the vehicle;
a sensor coupled to the vehicle; and
a global positioning and navigation system coupled to the vehicle.

15. The non-transitory computer-readable medium of claim 13, wherein the sound qualifier based on the gathered input data related to the one or more of the environmental context surrounding or within the vehicle, the occupant state within the vehicle, the vehicle state, and the noise condition inside or outside of the vehicle indicates an appropriate mood for the synthesized soundscape.

16. The non-transitory computer-readable medium of claim 13, wherein the audio generation module operable for receiving the sound qualifier from the artificial intelligence system and synthesizing the soundscape based on the sound qualifier using an explicit or implicit embedding in the sound qualifier.

17. The non-transitory computer-readable medium of claim 13, wherein the audio generation module operable for receiving the sound qualifier from the artificial intelligence system and synthesizing the soundscape including at least one audio sequence generated from a predetermined set of individual tones and frequencies.

18. The system of claim 1, wherein the synthesized soundscape includes at least one existing recording chosen by contextualizing the sound qualifier with at least one of lyrics or a title of the existing recording.

19. The system of claim 1, wherein the appropriate characteristic of the soundscape is pinpointed to the object in relation to movement of the vehicle utilizing at least one external vehicle sensor.

20. The system of claim 1, wherein the object indicated in the sound qualifier is identified based on the input data received from at least one external vehicle sensor.

* * * * *